United States Patent
Cheluvaraju et al.

(10) Patent No.: US 9,201,649 B2
(45) Date of Patent: Dec. 1, 2015

(54) SYSTEMS AND METHODS FOR ESTIMATING AN IMPACT OF CHANGING A SOURCE FILE IN A SOFTWARE

(71) Applicant: Infosys Limited, Bangalore (IN)

(72) Inventors: Bharath Cheluvaraju, Bangalore (IN); Sree Aurovindh Viswanathan, Tiruppur (IN)

(73) Assignee: Inforsys Limited, Bangalore (IN)

( * ) Notice: Subject to any disclaimer, the term of this patent is extended or adjusted under 35 U.S.C. 154(b) by 3 days.

(21) Appl. No.: 14/065,386

(22) Filed: Oct. 28, 2013

(65) Prior Publication Data

US 2014/0123108 A1  May 1, 2014

(30) Foreign Application Priority Data

Oct. 26, 2012 (IN) .......................... 4461/CHE/2012

(51) Int. Cl.
*G06F 9/44* (2006.01)
(52) U.S. Cl.
CPC ... *G06F 8/77* (2013.01); *G06F 8/75* (2013.01)
(58) Field of Classification Search
USPC ........................................................ 717/123
See application file for complete search history.

(56) References Cited

U.S. PATENT DOCUMENTS

| 7,058,561 | B1 * | 6/2006 | Kumar .............................. 703/22 |
| 7,725,763 | B2 * | 5/2010 | Vertes et al. .................. 714/6.12 |
| 7,958,400 | B2 | 6/2011 | Ur |
| 2011/0246968 | A1 | 10/2011 | Zhang et al. |
| 2013/0104109 | A1 * | 4/2013 | Edde et al. ..................... 717/135 |

FOREIGN PATENT DOCUMENTS

JP   2011048639 A   3/2010

* cited by examiner

*Primary Examiner* — John Chavis
(74) *Attorney, Agent, or Firm* — Marc S. Kaufman; Mark T. Vogelbacker; Reed Smith LLP

(57) ABSTRACT

The technique relates to a system and method for estimating an impact of changing one or more source files in a software based on a clone dependency graph. This technique involves extracting the source files from a repository and detecting code cones present in the source files. After detecting the code clones the clone dependency graph is created. Several graph metrics are calculated and applied to the clone dependency graph to estimate the impact of changing a source file on other source files of the software. Finally, the output is visualized with the help of graph visualization technique.

21 Claims, 5 Drawing Sheets

SYSTEMS AND METHODS FOR ESTIMATING AN IMPACT OF CHANGING A SOURCE FILE IN A SOFTWARE

RELATED APPLICATION DATA

This application claims priority to India Patent Application No. 4461/CHE/2012, filed Oct. 26, 2012, the disclosure of which is hereby incorporated by reference in its entirety.

FIELD OF THE INVENTION

The present invention relates generally to estimate impact of changing one or more source files in a software, and in particular, to a system and method for estimating an impact of changing one or more source files on the other source files of the software based on a clone dependency graph.

BACKGROUND

As the software industry has matured, there is a shift in the service offerings from being devoted to developing new software systems to making modifications in evolving software systems. One of the major problems for developers in an evolutionary software development environment is that a minor change or refactoring in a source file can cause major cascaded and unintended impacts at various segments of the system, thus, leading to undesirable or incompatible changes to the code. Source-code change impact analysis deals with capturing the information on what source parts get affected when modifications are made to another part of the software.

The present technologies in this field use history of various software artifacts like version and change history to analyze and predict/guide future changes, data mining techniques to mine the sequences of changed files from the version history and generate association rule based suggestion for new refactoring, reverse engineering technique to assist refactoring or perform dynamic impact analysis using information such as test suite executions, operation profile data and so on.

The present technologies have various limitations. It requires a fairly mature and a stable software change history and repository maintenance which might not be available at the time of the analysis. Further, Reverse engineering and dynamic impact analysis techniques are version history agnostic, but, are complicated and imperceptible in terms of the transparency that they provide to the developer. For example: A reverse engineering impact analysis tool might not be helpful to guide code-refactoring to the developer as the technique operates at a different layer of abstraction. In addition to that, with the existing techniques seamless integration of the impact analysis tool is not possible as they require additional information apart from the source-code repository to estimate change impact.

In view of the foregoing discussion, there is a need for mechanism to understand how a change to one segment of the software system will impact the other segments of the software.

SUMMARY

The present invention overcomes the limitation mentioned above by using the code-clone detection and graph metrics. The present technique analyzes the source-file repository and estimates the impact of a change to a particular source-file based on clone-dependency graph. This technique explores both implicit textual dependencies as well as imperceptible or cascaded textual dependencies. Further, it reduces effort in development and provides a visualization scheme for easy understanding of various modules and evaluates change impact for a particular source-file and provides recommendation without using any meta-documentation, thereby leading to savings in the overall cost of maintenance of the software.

According to the present embodiment, a method for estimating an impact of changing one or more source files in a software based on a clone dependency graph is disclosed. The method includes extracting the one or more source files of a software from a source code repository. Then, one or more code clones present in the one or more extracted source files of the software are detected based on a predefined threshold. After that, the clone dependency graph is created based on the one or more identified code clones. Thereafter, one or more graph metrics of the clone dependency graph are measured. In various embodiments of the present technique, the one or more graph metrics include degree centrality, closeness centrality, betweenness centrality, bonacich's centrality, graph clustering index and average path length. Further, the impact of changing the segment of the one or more source files is estimated based on the clone dependency graph and the one or more graph metrics. Finally, an output of the impact estimation is visualized by using a graph based visualization technique.

In an additional embodiment, a system for estimating an impact of changing one or more source files in a software based on a clone dependency graph is disclosed. The system includes a source code repository, a code clone detector, a clone dependency graph constructor, a graph processing engine, an impact analysis engine and a visualizer. The source code repository is configured to store the one or more source files. The code clone detector is configured to detect one or more code clones present in the one or more source files of the software based on a predefined threshold. The clone dependency graph constructor is configured to construct a clone dependency graph of the one or more source files. The graph processing engine is configured to compute one or more graph metrics. The impact analysis engine is configured to interpret the one or more graph metrics by applying the one or more graph metrics in the clone dependency graph. The visualizer is configured to visualize an output of the impact estimation by using a graph based visualization technique.

In another embodiment, a computer program product for estimating an impact of changing one or more source files in a software based on a clone dependency graph is disclosed. The computer program product includes a computer usable medium having a computer readable program code embodied therein for estimating an impact of changing one or more source files in a software based on a clone dependency graph. The computer readable program code storing a set of instructions configured for extracting the one or more source files of a software from a source code repository, detecting one or more code clones present in the one or more extracted source files of the software based on a predefined threshold, creating the clone dependency graph based on the one or more identified code clones, measuring one or more graph metrics of the clone dependency graph, estimating the impact of changing the segment of the one or more source files based on the clone dependency graph and the one or more graph metrics and visualizing an output of the impact estimation by using a graph based visualization technique.

BRIEF DESCRIPTION OF THE DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present technique provide a system and method for estimating an impact of changing one or more source files in a software based on a clone dependency graph. This involves extracting the source code from a source code repository and then with the help of code clone detector, the clones are detected based on a predefined threshold. Then, the clone dependency graph constructor constructs a clone dependency graph of the source files of the software. Then, the different graph metrics are calculated and the impact analysis is performed based on the said graph metrics. The outcome of the impact analysis can be visualized with the help of graph based visualization techniques.

Figure 1:
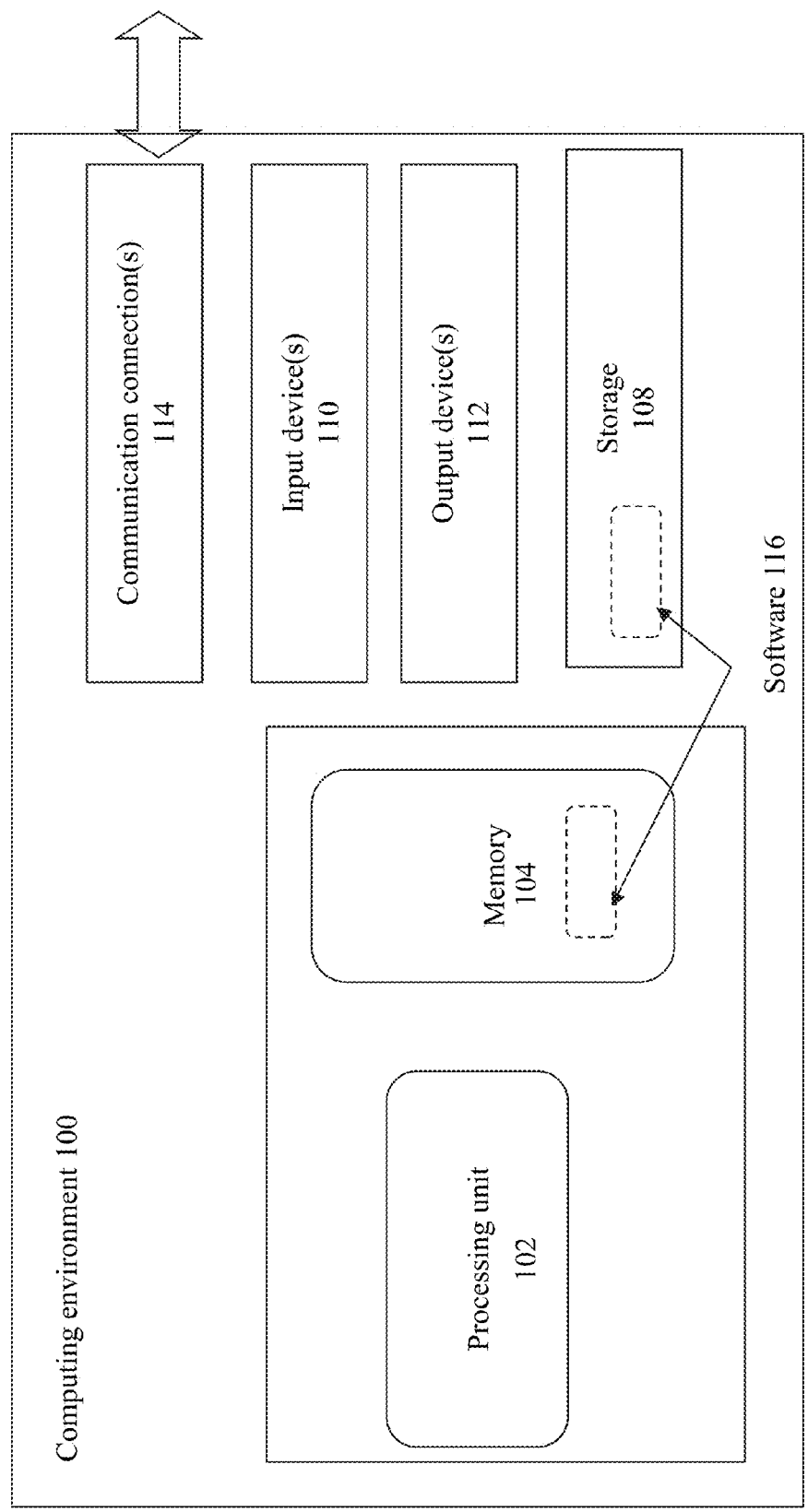
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multi-processor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
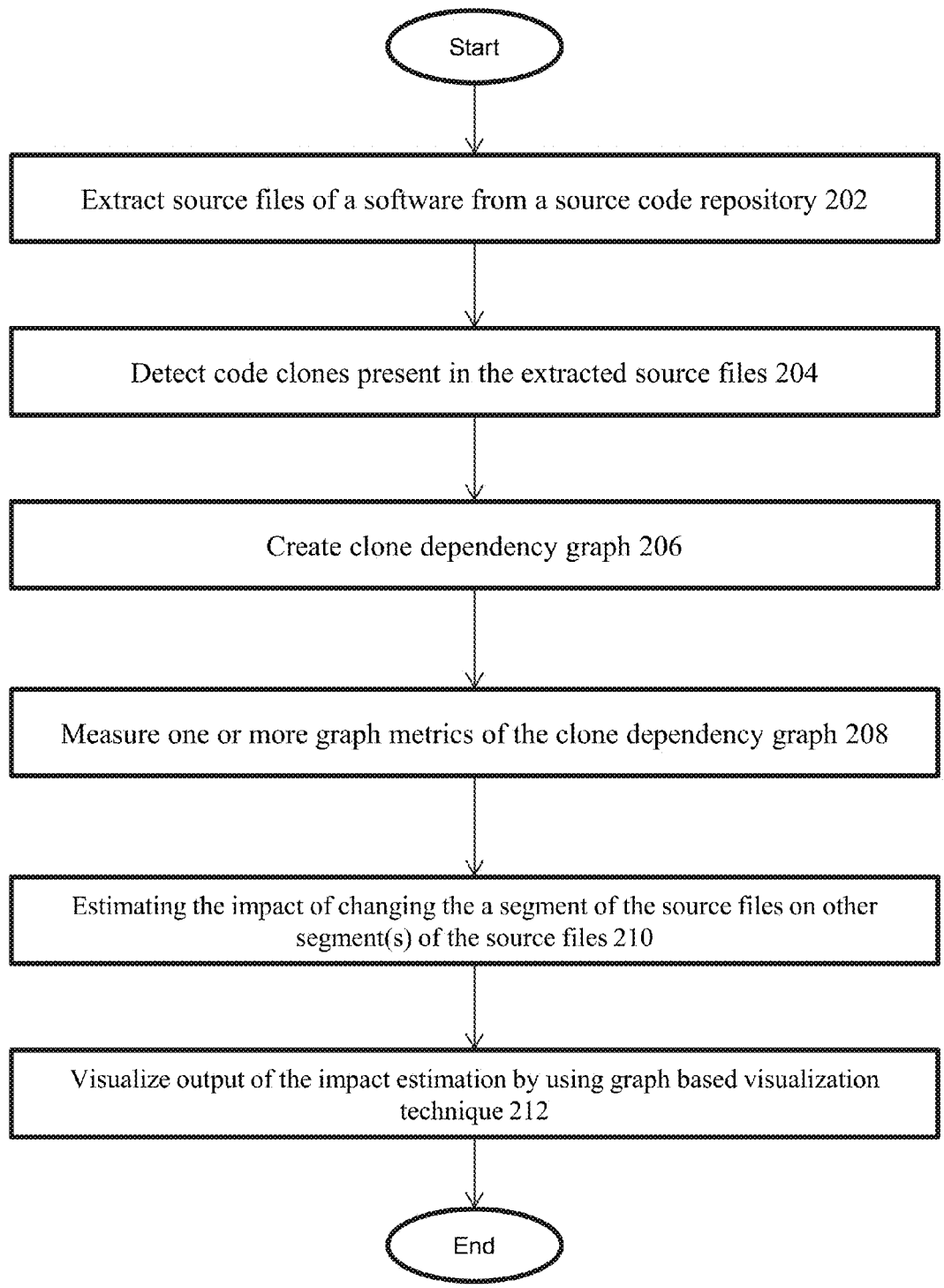
FIG. 2 is a flowchart, illustrating a method for estimating an impact of changing one or more source files in a software based on a clone dependency graph, in accordance with an embodiment of the present technique
Figure 3:
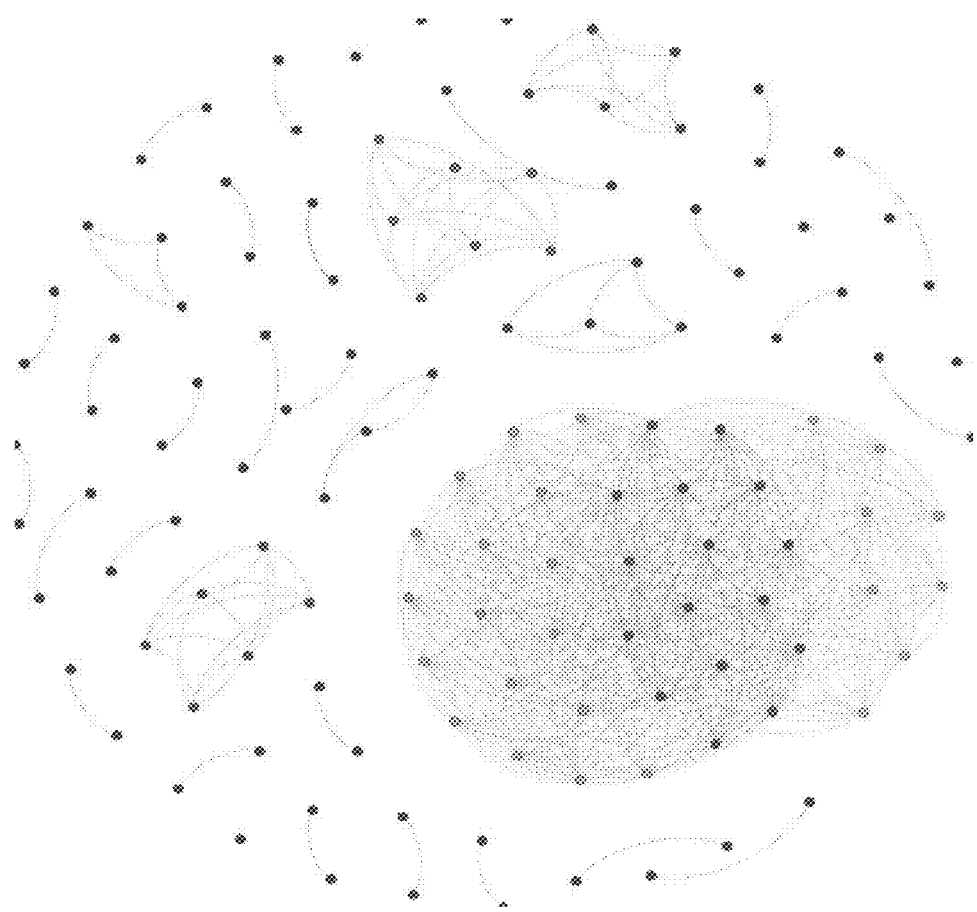
FIG. 3 is an exemplary diagram of a clone dependency graph of the software.

FIG. 2 is a flowchart, illustrating a method for estimating an impact of changing one or more source files in a software based on a clone dependency graph, in accordance with an embodiment of the present technique. The source files from the software are extracted from a source code repository, as in step 202. The source files are preprocessed to retain only the source code elements and all the non source code related entities are removed. Thereafter, the preprocessed source files are fed into the code clone detector and code clone detector detects the code clones present in the extracted preprocessed source files based on a predefined threshold, as in step 204. The code clone detector also determines the value of the clone mass, i.e. the ratio of number of common lines between the source files to the total length of the source file. The threshold is in terms of number of lines that are common between the source files. Code clones is a sequence of source code that occurs more than once, either within a single source file, a common package or across different programs owned or maintained by the same entity. After detecting code clones, a clone dependency graph is created by using a cone dependency graph constructor, as in step 206. An exemplary clone dependency graph is shown in FIG. 3. The clone dependency graph is constructed as a directed graph with the source files of the software constituting the nodes, an edge is created between the source files (nodes) that have some lines of source code in common and the weight of the edge denotes the clone mass between the source files.

Referring back to FIG. 2, one or more graph metrics of the clone dependency are measured, as in step 208. The graph theory metrics are divided into two types, namely, global metrics and local metrics. Global metrics provide a measurement of a structural property of a whole graph. They are designed to characterize two important behavior of the graph, namely, a) System dynamics: this measures what aspects of the system's structure influence its behavior.

b) Structural dynamics: these measures how robust are the system's structure when subject to change.

On the other hand, the local metrics provide a measurement of a structural property of a single node. They are designed to characterize two important features:

a) Functional role: this measures the role of the node in system dynamics.

b) Structural importance: this measures how important the node is to the structural characteristics of the system.

The details of the various global and local metrics are tabulated below:

TABLE 1

| Metric Type | Metric | Details |
|---|---|---|
| Local | Degree centrality | The ideology behind this metric is that "An important node is involved in large number of connections/interactions". Formally, $C_d(u) = \deg(u)$ Where, $\deg()$ is the total degree of the node u |
| Local | Closeness centrality | The ideology behind this metric is that "An important node is typically "close" to, and can communicate quickly with, the other nodes in the network" Closeness centrality is based on geodesic distance and tries to quantify the intuitive notion of what one terms central or peripheral in a two dimensional region. Formally, $C_c(u) = \sum_{\{v \in V(G)\}} \delta(u, v)$ Where, $\delta(u, v)$ is the shortest distance between the node to all other nodes in the graph |
| Local | Betweenness centrality | The ideology behind this metric is that "An important node will lie on a high proportion of paths between other nodes in the network." Formally, $C_b = \sum_{s \neq v \in V} \sum_{t \neq v \in V} \delta_{st}(v)$ Where, $\delta_{st}(v) = \frac{\sigma_{st}(v)}{\sigma_{st}}$ Here, $\sigma_{st}(v)$ denotes the fraction of shortest paths between s and t that contain vertex v and $\sigma_{st}$ denotes total number of shortest paths from s to t. $\delta_{st}(v)$ denotes the fraction of shortest paths from s to t that pass through v. |
| Local | Bonacich's centrality | "An important node is connected to important neighbors." is the ideology behind this metric. This technique is similar to page Rank algorithm. |
| Global | Graph clustering index | The goal of clustering is to group a graph into sub-graphs in a meaningful way, with the interpretation of the grouping dictated by the domain. i.e. identify sub-graph such that the nodes within the sub-graph are more densely connected internally than with the rest of the network |
| Global | Avg. Path Length | Graphs with a low average path length, the transfer of information between nodes takes place rapidly. |

In accordance with various embodiments of the present technique the distance between the nodes represents the weight between the nodes and all these data are collected from the code clone detector. Once the graph metrics are calculated, the impact of changing one or more segments of the source files on the other segments of the source files is estimated, as in step 210. Several graph theory metrics as mentioned in Table 1 are applied on the constructed code dependency graph. The mapping between the graph theoretic measures to their applicability to measuring impact analysis is tabulated below:

TABLE 2

| Graph Metric | Application to Impact Analysis Estimation |
|---|---|
| Degree centrality | In the context of impact analysis, a node with greater degree centrality has many clone-snippets in various other source files. Therefore, has a higher impact. On the other hand, a node can have high degree centrality either if a large portion of it is cloned in fewer places or if small portions of it are cloned in a large number of places. Since, the latter's impact is greater than the former, we denote the impact of the node to be proportional to the production of degree centrality of the node and the number of edges connected to that node. $I_d^i \propto C_d * |E_i|$ Where, $I_d^i \to$ Degree impact of ith node And $|E_i| \to$ Number of edges affiliated to the node i. |
| Closeness centrality | In the context of impact analysis, a node with high closeness is likely to be affected with a large probability if there is a change in the neighboring nodes. Mathematically, $I_c^i \propto C_c$ |
| Betweenness centrality | In the context of impact analysis, a node with high betweenness is a candidate for a high impact node. $I_b^i \propto C_b$ |
| Bonacich's centrality | In the context of impact analysis, a node with high Bonacich's centrality is a candidate for a high impact node. $I_{bc}^i \propto C_{bc}$ |
| Graph clustering index | Graph clustering would result in formations of sub-graphs which are tightly coupled in-terms of their connectivity within the sub-graph as opposed to their connectivity with outside of the sub-graph. These sub-graphs are candidates of tightly coupled modules. The avg. path length of each sub-graph of the graph cluster would denote the impact of the modules within them. Thus, the modular impact of every node in a graph cluster is viewed as one of the metrics for impact and is equal to the average path length of the cluster/sub-graph. $I_{gci}^{i,k} \propto \text{AvgPathLength}(G_k)$ Where, $I_{gci}^{i,k} \to$ is the impact of the all the nodes in the kth cluster AvgPathLength$(G_k) \to$ is the avg. path length of the kth cluster |

The overall impact of a node i in the clone dependency graph is computed as a weighted average of the all the metrics mentioned in Table 2. Mathematically, $$I_G^i = w_d \times I_d^i + w_c \times I_c^i + w_b \times I_b^i + w_{bc} \times I_{bc}^i + w_{gci} \times I_{gci}^{i,k}$$

Where, w indicates the corresponding weight associated with the appropriate impact measure.

Figure 4:
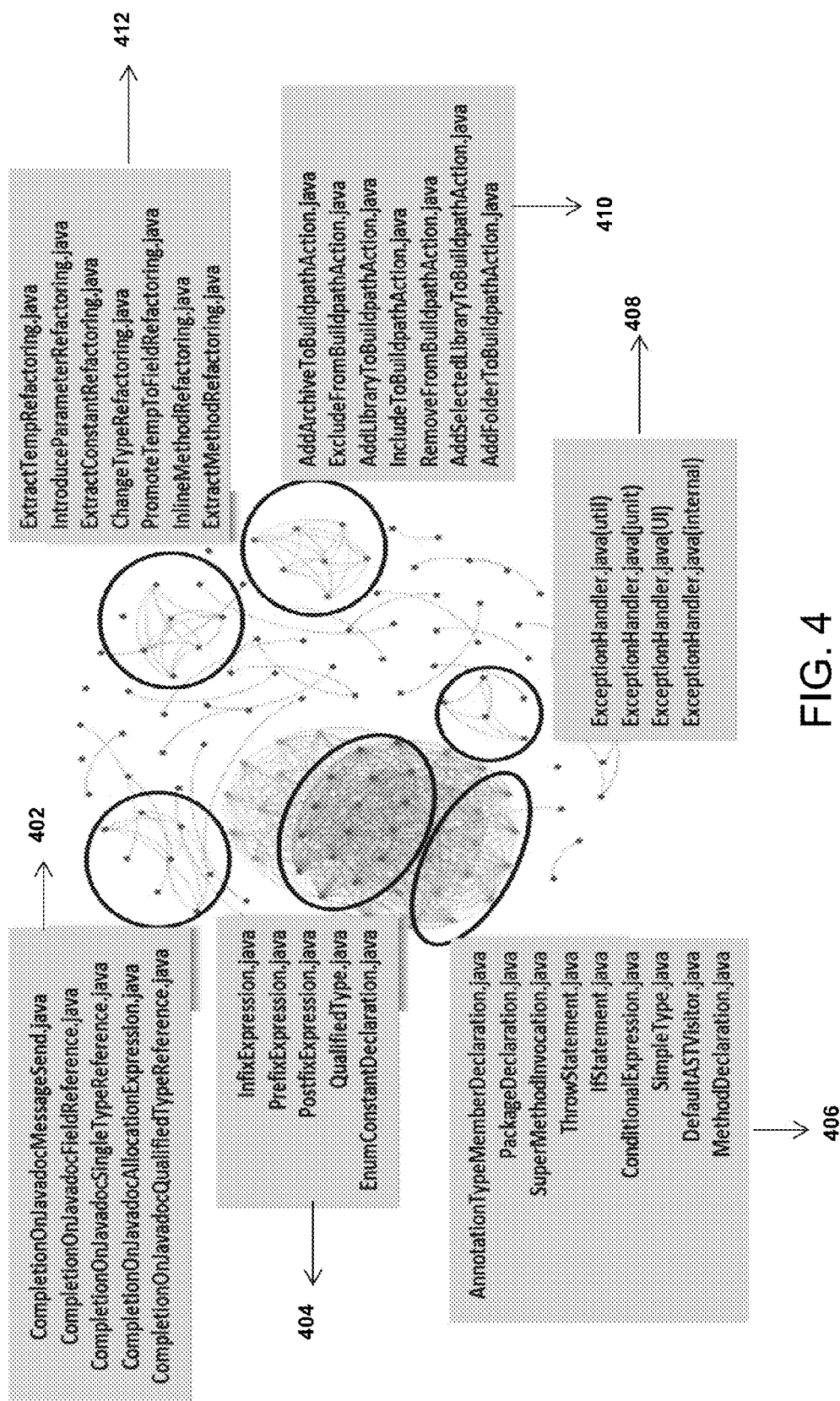
FIG. 4 is an exemplary diagram produced by the visualizer showing an output of the impact estimation.

Referring back to FIG. 2, the output of the impact estimation is visualized by using graph based visualization technique. An exemplary diagram produced by the visualizer is given in FIG. 4. The visualizer shows how intensely the nodes are interconnected with each other along with the name of the source files. For example, at 402, the visualizer shows that the source files namely CompletionOnJavadocMessageSend.java, CompletionOnJavadocFieldReference.java, Completion OnJavadocSingleTypeReference.java, CompletionOnJavadocAllocationExpression.java, CompletionOnJavadocQualifiedType.java are very intensely interconnected, i.e. any changes made in any of these files can impact on other files of these series. Similarly, at 404, InfixExpression.java, PrefixExpression.java, PostfixExpression.java, QualifiedTypeExpression.java, EnumConstantDeclaration.java are very intensely interconnected. Similarly, at 406, AnnotationTypeMemberdeclaration.java, PackageDeclaration.java, SuperMethodInvocation.java, ThrowStatement.java, IfStatement.java, ConditionalExpression.java, SimpleType.java, DefaultASTVisitor.java, MethodDeclaration.java are interconnected. Similarly, at 408, ExceptionHandler.java(util), ExceptionHandler.java(junit), ExceptionHandler.java(UI), ExceptionHandler.java(internal) are interconnected. At 410, AddArchivetoBuildpathAction.java, ExcludeFromBuildpathAction.java, AddLibrarytoBuildpathAction.java, IncludetoBuildpathAction.java, RemoveFromBuildpathAction.java, AddSelectedLibrarytoBuildpathAction.java, AddFoldertoBuildpathAction.java are interconnected and at, 412, ExtractTempRefactoring.java, IntroduceParameterRefactoring.java, ExtractConstantRefactoring.java, ChangeTypeRefactoring.java, PromoteTemptoFieldRefactoringjava, InlineMethodRefactoring.java, ExtractMethodRefactoring.java are interconnected.

Figure 5:
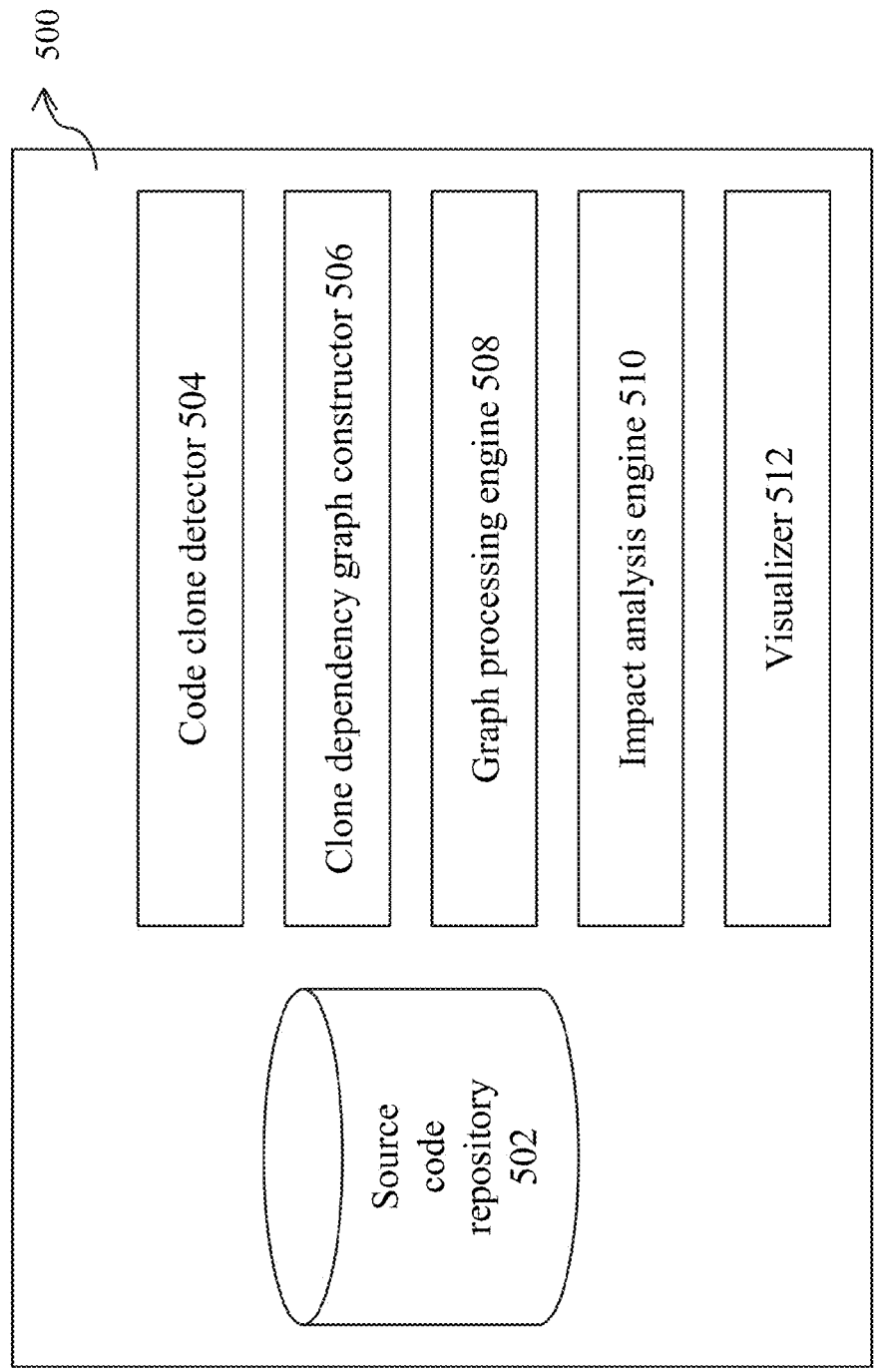
FIG. 5 is a block diagram illustrating a system for estimating an impact of changing one or more source files in a software based on a clone dependency graph, in accordance with an embodiment of the present technique.

FIG. 5 is a block diagram illustrating a system for estimating an impact of changing one or more source files in a software based on a clone dependency graph, in accordance with an embodiment of the present technique. More particularly, the system includes a source code repository (502), a code clone detector (504), a clone dependency graph constructor (506), a graph processing engine (508), an impact analysis engine (510) and a visualizer (512). The source code repository (502) is the repository of the source files. The source files in the repository are preprocessed and cleaned to remove code comments and other non-relevant part of the source code. The code clone detector (504) applies code clone detection techniques on the source code repository (502) and generates pairwise clone similarity score which is also known as clone mass. The clone mass is the ratio of the number of lines that are common between the clone pairs to the total number of lines in source file. The clone dependency graph constructor (506) constructs a clone dependency graph of source files. The clone dependency graph is a directed graph with the source files of the software constituting the nodes, an edge is created between each clone pair and the edge weight is equal to the corresponding clone mass. An exemplary clone dependency graph is shown in FIG. 3. The graph processing engine (508) computes the entire graph related metrics as described in table 1. The impact analysis engine (510) interfaces with the graph processing engine (508) and interprets the metrics to estimate the change impact across source files as mentioned in table 2. The visualizer (512) provides visualization scheme to visualize change-impact estimations. An exemplary diagram produced by the visualizer is given in FIG. 4.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method, implemented by one or more computing devices, for estimating an impact of changing one or more source files in a software based on a clone dependency graph, the method comprising:
    extracting the one or more source files of a software from a source code repository;
    detecting one or more code clones present in the one or more extracted source files of the software based on a predefined threshold;
    creating the clone dependency graph based on the one or more identified code clones, the clone dependency graph including one or more nodes and one or more edges, the one or more edges having a weight denoting a clone mass, the clone mass having a value equal to a ratio of a number of common lines between the one or more extracted source files and a total length of the one or more source files;
    measuring one or more graph metrics of the clone dependency graph, wherein the one or more graph metrics include degree centrality, closeness centrality, betweenness centrality, bonacich's centrality, graph clustering index and average path length; and
    estimating the impact of changing the segment of the one or more source files based on the clone dependency graph and the one or more graph metrics.

2. The method as claimed in claim 1, further comprises visualizing an output of the impact estimation by using a graph based visualization technique.

3. The method as claimed in claim 1, wherein the one or more source files are preprocessed to remove the one or more non source code elements.

4. The method as claimed in claim 1, wherein the threshold determines an upper limit of permitted similarity between one or more lines of the one or more source files.

5. The method as claimed in claim 1, wherein the clone dependency graph is a directed graph.

6. The method as claimed in claim 5, wherein the one or more nodes are the one or more source files of the software.

7. The method as claimed in claim 5, wherein the one or more edges connect the one or more source files which have at least one line of source code in common.

8. The method as claimed in claim 1, wherein the impact is estimated by computing a weighted average of the one or more graph metrics.

9. A system for estimating an impact of changing one or more source files in a software based on a clone dependency graph, the system comprising:
    a processor in operable communication with a processor readable non-transitory storage medium, the processor readable non-transitory storage medium containing one or more programming instructions whereby the processor is configured to implement:
- a source code repository configured to store the one or more source files;
- a code clone detector configured to detect one or more code clones present in the one or more source files of the software based on a predefined threshold;
- a clone dependency graph constructor configured to construct a clone dependency graph of the one or more source files, the clone dependency graph including one or more nodes and one or more edges, the one or more edges having a weight denoting a clone mass, the clone mass having a value equal to a ratio of a number of common lines between the one or more extracted source files and a total length of the one or more source files;
- a graph processing engine configured to compute one or more graph metrics; and
- an impact analysis engine configured to interpret the one or more graph metrics by applying the one or more graph metrics in the clone dependency graph.

10. The system as claimed in claim 9, further comprises a visualizer configured to visualize an output of the impact estimation by using a graph based visualization technique.

11. The system as claimed in claim 9, wherein the one or more source files are preprocessed to remove the one or more non source code elements.

12. The system as claimed in claim 9, wherein the threshold determines an upper limit of permitted similarity between one or more lines of the one or more source files.

13. The system as claimed in claim 9, wherein the clone dependency graph is a directed graph.

14. The system as claimed in claim 13, wherein the one or more nodes are the one or more source files of the software.

15. The system as claimed in claim 13, wherein the one or more edges connect the one or more source files which have at least one line of source code in common.

16. The system as claimed in claim 9, wherein the one or more graph metrics include one or more local metrics and one or more global metrics.

17. The system as claimed in claim 16, wherein the one or more local metrics include degree centrality, closeness centrality, betweenness centrality and bonacich's centrality.

18. The system as claimed in claim 16, wherein the one or more global metrics include graph clustering index and average path length.

19. The system as claimed in claim 9, wherein the impact is estimated by computing a weighted average of the one or more graph metrics.

20. A computer program product for use with a computer, the computer program product comprising a non-transitory computer readable medium having computer readable program code embodied therein for estimating an impact of changing one or more source files in a software based on a clone dependency graph, the computer readable program code storing a set of instructions configured for:
- extracting the one or more source files of a software from a source code repository;
- detecting one or more code clones present in the one or more extracted source files of the software based on a predefined threshold;
- creating the clone dependency graph based on the one or more identified code clones, the clone dependency graph including one or more nodes and one or more edges, the one or more edges having a weight denoting a clone mass, the clone mass having a value equal to a ratio of a number of common lines between the one or more extracted source files and a total length of the one or more source files;
- measuring one or more graph metrics of the clone dependency graph, wherein the one or more graph metrics include degree centrality, closeness centrality, betweenness centrality, bonacich's centrality, graph clustering index and average path length; and
- estimating the impact of changing the segment of the one or more source files based on the clone dependency graph and the one or more graph metrics.

21. The computer program product as claimed in claim 20, further comprises visualizing an output of the impact estimation by using a graph based visualization technique.

* * * * *